US006245360B1

(12) United States Patent
Markowitz

(10) Patent No.: US 6,245,360 B1
(45) Date of Patent: Jun. 12, 2001

(54) NUTRITIONAL SUPPLEMENT

(76) Inventor: John S. Markowitz, 2276 Saltwind Way, Mt. Pleasant, SC (US) 29464

( * ) Notice: Subject to any disclaimer, the term of this patent is extended or adjusted under 35 U.S.C. 154(b) by 0 days.

(21) Appl. No.: 09/340,106

(22) Filed: Jun. 25, 1999

Related U.S. Application Data

(60) Provisional application No. 60/090,883, filed on Jun. 26, 1998.

(51) Int. Cl.[7] ............................. A61K 33/00; A61K 9/20; A61K 31/00
(52) U.S. Cl. ........................ 424/641; 424/464; 424/468; 424/643; 424/646; 424/682; 424/702; 426/72; 426/73; 426/74; 514/52; 514/167; 514/168; 514/248; 514/251; 514/252; 514/253; 514/276; 514/315; 514/345; 514/356; 514/387; 514/458; 514/474; 514/492; 514/494; 514/502; 514/724; 514/810; 514/811; 514/904; 514/905; 514/964
(58) Field of Search .................................. 424/464, 468, 424/641, 643, 646, 682, 702; 426/72, 73, 74; 514/52, 167, 168, 248, 251, 276, 315, 252, 295, 345, 356, 387, 458, 474, 492, 494, 502, 724, 810, 811, 904, 905, 964

(56) References Cited

U.S. PATENT DOCUMENTS

| | | | |
|---|---|---|---|
| 4,500,515 | 2/1985 | Libby | 424/154 |
| 4,918,102 | 4/1990 | Dobbins | 514/505 |
| 5,013,752 | 5/1991 | Dobbins | 514/505 |
| 5,189,064 | 2/1993 | Blum et al. | 514/561 |
| 5,308,627 | 5/1994 | Umbdenstock, Jr. | 424/639 |
| 5,332,579 | 7/1994 | Umbdenstock | 424/639 |
| 5,561,160 | * 10/1996 | Walaszek et al. | 514/574 |

OTHER PUBLICATIONS

Markowitz et al., "Savings on Nutritional Supplements Administered to Patients with Chronic Alcoholism," *Am J Health–Syst Pharm*, vol. 53, p. 1336, Jun. 1996.

* cited by examiner

*Primary Examiner*—Jose' G. Dees
*Assistant Examiner*—Frank Choi
(74) *Attorney, Agent, or Firm*—Kenyon & Kenyon

(57) ABSTRACT

A single entity product is provided for administration to persons being treated for nutritional deficiencies associated with addiction to alcohol, wherein the product is an extended-release multivitamin with minerals and trace elements in beneficial dose ranges and specifically contains thiamine and folic acid in the desired amounts of about 100 mg and 1 mg, respectively. The product may also contain riboflavin in an amount between about 1 mg and about 3 mg, pyridoxine in an amount between about 1 mg and about 3 mg, cyanocobalamin in an amount between about 6 mg and about 12 mg, biotin in an amount between about 10 mcg and about 50 mcg, niacin in an amount between about 10 mg and about 50 mg, vitamin D in an amount between about 200 IU and about 500 IU, vitamin E in an amount between about 10 IU and about 50 IU, selenium in an amount between about 5 mcg and about 50 mcg, and/or magnesium in an amount between about 100 mg and about 400 mg.

16 Claims, No Drawings

NUTRITIONAL SUPPLEMENT

This application claims the benefit of provisional No. 60/090,883 filed Jun. 26, 1998.

FIELD OF THE INVENTION

This invention relates to vitamin and mineral supplements specifically formulated to target the nutrient deficits commonly encountered in malnourished alcoholic patients during their recovery.

BACKGROUND OF THE INVENTION

Each year, approximately 1.5 million Americans seek medical/psychiatric treatment for alcoholism. Alcoholism remains one of the major causes of nutritional deficiency syndromes in the United States. Alcohol (ethanol) is directly toxic to many tissues and can affect almost every cell and organ system in the human body. Additionally, chronic use leads to impaired absorption, transport, and storage of numerous vitamins and minerals (Persson J., *Scandinavian Journal of Gastroenterology*, 1991;26: pp. 3–15.). Further, the nutritional content of ethanol is very poor and is often consumed in the context of inadequate dietary intake. For example, on average Americans consume about 4.5% of total calories as alcohol while alcoholics may consume 50% of their daily calories as ethanol (Feinman L., Lieber C. S. in: *Medical and Nutritional Complications of Alcoholism: Mechanisms of Management*. (Ed. Lieber, C. S.), 1992 Plenum Medical Book Company, New York, pp. 515–530.). The exact reasons for poor food intake among alcoholics are unknown but may include depressed consciousness during intoxication, hangover, and gastrointestinal problems induced by ethanol consumption.

Vitamins

Serious medical complications may occur as a result of uncorrected malnutrition. Most notably, as a result of thiamine (Vitamin $B_1$) deficiency, Wernicke's syndrome, an encephalopathy marked by gait disturbance, acute confusion, memory loss and disorientation may develop in chronic users of ethanol. If untreated with thiamine supplementation, this condition may progress to the more serious Korsakoffs syndrome, a permanent disorder leading to brain damage in which patients manifest symptoms such as psychosis, severe memory loss, delirium, insomnia, and painful extremities. These patients frequently require long-term institutionalization. Additionally, beriberi heart disease and possibly polyneuropathy may result from thiamine deficiency. Alcoholics have demonstrated impaired abilities to absorb thiamine (Holzbach E. *Journal of Studies on Alcohol*, 1996;57: pp. 581–584.). However, it is clinically impractical to measure thiamine blood concentrations. Thiamine corrects early Wernicke signs rapidly and may prevent development of an irreversible Korsakoff dementia. Once the dementia is established, thiamine usually does not help. Therefore, due to the relative safety and ease of administering thiamine, 50–100 mg is generally given orally as a separate drug entity to [all] alcoholics daily while in treatment.

A significant number of alcoholics suffer from anemia, a general term for describing a reduction in the number of circulating red blood cells (erythrocytes). The clinical expression of anemia results from tissue hypoxia or oxygen starvation and the resulting cardiovascular pulmonary compensatory responses. Severe anemia is associated with weakness, vertigo, headache, tinnitus, fatigue, drowsiness, irritability, and in some cases bizarre behavior. Additionally, amenorrhea, loss of libido, GI complaints, and splenomegaly can result. Finally, heart failure and shock may result in some patients. Specifically, megaloblastic anemia, a disorder in the body's ability to manufacture functional red blood cells (erythropoiesis) may occur in a large number of alcoholics as a result of depleted B-complex vitamins such as folic acid and/or cyanocobalamin (Vitamin $B_{12}$). Alcoholics tend to have low folic acid status when they are drinking. Ethanol is also known to accelerate the production of megaloblastic anemia in patients with depleted folic acid stores. In addition to folic acid deficiency, the direct effect of ethanol on bone marrow, liver disease, bleeding, iron deficiency, and infection may exert additive influences on the hematological status of the alcoholic. For this reason, chronic ethanol users are commonly administered 1 mg of folic acid by mouth daily as a separate drug entity while in treatment to replete folic acid stores.

When there is a general poor intake of B-vitamins, riboflavin (Vitamin $B_2$) deficiency may result, and this has been found to be the case with alcoholics (Cook C. C. H, Thomson A. D. *British Journal of Hospital Medicine*, 1997;57: pp.461–465.). Clinical consequences of riboflavin deficiency include behavioral changes and peripheral neuropathy. For this reason, riboflavin is commonly administered to alcoholics daily as a component (1–3 mg) of a multivitamin as long as they are in treatment.

Behavioral changes, neurological disorders, peripheral neuropathy and dermatological disorders can result in part due to pyridoxine (Vitamin $B_6$) deficiency disorders. This is most important with regard to alcoholics since up to 50% may have pyridoxine deficiencies as measured in plasma. It is unknown if inadequate dietary intake alone accounts for the deficiency, but increased destruction and reduced formation of pyridoxine may be related to ethanol use. Whatever the cause, clinical management usually involves provision of pyridoxine (1–3 mg) as part of a daily multivitamin administered as long as the patient is in treatment.

The absorption of cyanocobalamin (Vitamin $B_{12}$) has also been shown to be decreased when coadministered with ethanol. Deficiencies may result in hematological as well as neurological disorders. Cyanocobalamin (6–12 mg) is commonly administered as part of a multivitamin supplement on a daily basis to alcoholics in treatment.

Biotin is a coenzyme that is essential to the metabolism of both fatty acids and carbohydrates. Deficiency states may result in dermatological disorders. Biotin 10–50 mcg is commonly included in multivitamin supplements used in the treatment of malnourished individuals.

Niacin (Nicotinic acid) deficiency may develop as a result of poor dietary intake among alcoholics. This water soluble vitamin is found in many of the same foods which contain thiamine. Severe niacin deficiency may result in the clinical condition of Pellagra which is characterized by dermatologic, central nervous system, and gastrointestinal symptoms. Niacin is generally included as part of a multivitamin preparation in doses of 10–50 mg given daily.

Clearly, alcoholics have illness related to abnormalities of vitamin D (cholecalciferol) and calcium. They have decreases in bone density and bone mass and increased susceptibility to bone fractures. Decreased blood calcium, phosphorous, magnesium and 25-OH-vitamin D have been reported. Changes in vitamin D metabolism may result from the inability of the alcoholic to hydroxylate vitamin D3 at the 25 position to its more active form. This condition may be in part due to poor liver function, decreased exposure to sunlight, a diet deficient in vitamin D, and malabsorption of fat. The end result may be osteomalacia leading to bone pain and fractures. Since poor dietary intake is common in alcoholics, vitamin D 200–500 IU administered as part of a multivitamin on a daily basis may be prudent.

Vitamin E and selenium serve protective roles as antioxidants and function synergistically in the human body. For instance, vitamin E reduces selenium requirements, prevents its loss from the body, and maintains it in its active form. Conversely, selenium spares vitamin E and reduces the requirement for the vitamin. Alcoholic patients and patients with poor fat absorption may become deficient in vitamin E. Clinical manifestations of vitamin E deficiency include decreased erythrocyte survival, and neurological disturbances including visual problems. Vitamin E 10–50 IU as a component of multivitamin supplements should be administered daily.

Trace Elements

There are 13 trace elements presently recognized as necessary for normal biological functioning of the human body. They are referred to as trace elements as they occur in concentrations <0.005% body weight. In order of demonstrated need they are iron, iodine, copper, manganese, zinc, cobalt, molybdenum, selenium, chromium, fluorine, silicon, nickel, and arsenic (The Merck Manual, 15th Edition (1987) pp. 894–1013). Importantly, a variety of essential trace elements such as magnesium, zinc, and selenium are often found in inadequate amounts in chronic alcoholics (Cook C. C. H., Walden R. J., Graham B. R., Gillham C., Davies S., Prichard B. N. C. Alcohol & Alcoholism, 1991;26: pp. 541–548.).

Serum selenium levels have been found to be decreased in the alcoholic, especially in the presence of liver disease. Selenium should be supplemented if patients are suspected to be deficient in this element. Muscle pain and tenderness have been reported to result from deficiency states. Selenium may be administered at doses from 5–50 mcg daily. However, at present, no U.S. Recommended Daily Allowance (RDA) has been established.

Chronic alcoholism is clearly associated with magnesium deficiency as measured by serum levels of the element. Alcohol ingestion is known to cause magnesium excretion. Magnesium deficiency may lead to hypocalcemia and hypoparathyroidism and clinical manifestations may include lethargy, weakness, anorexia nausea. If magnesium deficiency is suspected or confirmed, repletion is indicated. This may be done by giving the element intramuscularly or by oral supplementation. Magnesiun 100–400 mg may be given orally as a supplement daily.

As a consequence of the known risk of malnutrition in this patient population, most physicians who treat alcoholic patients in the inpatient hospital settings tend to treat alcoholics with three (3) immediate release oral supplement products, a multivitamin, thiamine 100 mg, and folic acid 1 mg. Additionally, some patients are also treated with thiamine and magnesium sulfate intramuscularly on admission.

At present there is no existing single entity product to administer to patients which is an extended-release multivitamin with minerals and trace elements in the aforementioned dose ranges and which specifically contains thiamine and folic acid in the desired amounts of 100 mg and 1 mg, respectively. Umbdenstock (U.S. Pat. No. 5,308,627) described a nutritional product to assist persons recovering from addictions to various health damaging substances. The product did not have folic acid in the appropriate amount (1 mg), and 3 tablets would have to be administered to approach 100 mg of thiamine. Additionally, the Umbdenstock product contains valerian, an herbal product of questionable utility, sedating effects, and unlikely to be recommended by most physicians treating alcoholic patients. Lastly, the product was not an extended release formulation.

SUMMARY OF THE INVENTION

An object of the present invention is to provide a single entity product to administer to patients which is an extended-release multivitamin with minerals and trace elements in beneficial dose ranges and which specifically contains thiamine and folic acid in the desired amounts of 100 mg and 1 mg, respectively. The product may be in the form of a pill, wherein the term "pill" herein is used to include both tablets and capsules.

Inherent advantages of administering a single product rather than three separate entities are increased patient compliance, decreased cost through decreased nursing staff time to administer one agent rather than three, and decreased pharmacy cost in acquisition, inventory, and dispensing time related to a single agent compared to three agents. Additionally, the potential for medication administration errors would be reduced. A further advantage would be the administration of a fewer number of pills to a population who often have an over-reliance or concomitant dependence issues with medications in addition to their alcoholism. Finally, an extended-release product will allow for greater absorption of the included water soluble vitamins (C, $B_2$, $B_6$, $B_{12}$), which, unlike fat soluble vitamins (A, D, E, K), are rapidly excreted from the body following oral supplementation.

The nutritional supplemental needs of chronic alcohol users include Vitamins A, C, $B_1$, $B_2$, $B_6$, $B_{12}$, D, E, Niacin, Folic acid, and biotin (see Table 1). Mineral and trace element deficiencies identified in alcoholics include calcium, iron, magnesium, zinc, and selenium. These deficiencies, if uncorrected, may result in a variety of adverse physical and psychiatric effects as described above. The nutritional components of this invention provide the appropriate substances in sufficient amounts to replenish the malnourished individual. By supplying the correct amounts of each supplement within a single entity, the present invention simplifies treatment by avoiding the inconvenience, potential for error, and cost of administering multiple nutritional supplements to an individual patient. Additionally, the extended-release formulation of the invention allows for enhancement of absorption of water soluble vitamins compared to available immediate-release products.

DETAILED DESCRIPTION

As an example of a nutritional supplement according to the invention, an extended release pill may be provided which contains the following components:

TABLE I

| Vitamins | |
| --- | --- |
| Vitamin A | 5000 I.U. |
| Vitamin C (Ascorbic acid) | 500 mg |
| Vitamin $B_1$ (Thiamine) | 100 mg |
| Vitamin $B_2$ (Riboflavin) | 3 mg |
| Vitamin $B_6$ (Pyridoxine) | 3 mg |
| Vitamin $B_{12}$ (Cyanocobalamin) | 12 mg |
| Niacin (Niacinamide) | 20 mg |
| Vitamin D (Cholecalciferol) | 400 I.U. |
| Vitamin E (dl-alpha-Tocopherly Acetate) | 30 I.U. |
| Folic Acid | 1 mg |
| Biotin | 30 mcg |

TABLE I-continued

| Minerals | |
|---|---|
| Calcium | 250 mg |
| Iron (Ferrous fumerate) | 60 mg |
| Magnesium (Magnesium Oxide) | 200 mg |
| Zinc (Zinc Sulfate) | 4 mg |
| Selenium | 10 mcg |

As examples of possible variations, the following components may be supplied within the ranges given below:

thiamine in an amount between about 50 mg and about 100 mg;

riboflavin in an amount between about 1 mg and about 3 mg;

pyridoxine in an amount between about 1 mg and about 3 mg;

cyanocobalamin in an amount between about 6 mg and about 12 mg;

biotin in an amount between about 10 mcg and about 50 mcg;

niacin in an amount between about 10 mg and about 50 mg;

vitamin D in an amount between about 200 IU and about 500 IU;

vitamin E in an amount between about 10 IU and about 50 IU;

selenium in an amount between about 5 mcg and about 50 mcg; and magnesium in an amount between about 100 mg and about 400 mg.

Persons of ordinary skill in the art will recognize that certain variations of the above formulation may be made without departing from the scope of the invention, as defined by the claims.

What is claimed is:

1. A nutritional supplement for administration to persons being treated for nutritional deficiencies associated with addiction to alcohol, the nutritional supplement consisting of a single extended-release pill, wherein the single extended-release pill comprises the following components:

vitamin A in an amount of about 5,000 IU;
vitamin C in an amount of about 500 mg;
thiamine in an amount of about 100 mg;
riboflavin in an amount of about 3 mg;
pyridoxine in an amount of about 3 mg;
cyanocobalamin in an amount of about 12 mg;
niacin in an amount of about 20 mg;
vitamin D in an amount of about 400 IU;
vitamin E in an amount of about 30 IU;
folic acid in an amount of about 1 mg;
biotin in an amount of about 30 mcg;
calcium in an amount of about 250 mg;
iron in an amount of about 60 mg;
magnesium in an amount of about 200 mg;
zinc in an amount of about 4 mg; and
selenium in an amount of about 10 mcg.

2. A nutritional supplement for administration to persons being treated for nutritional deficiencies associated with addiction to alcohol, the nutritional supplement consisting of a single pill, wherein the single pill comprises the following components:

vitamin A;
vitamin C;
thiamine in an amount between about 50 mg and about 100 mg;
riboflavin in an amount between about 1 mg and about 3 mg;
pyridoxine in an amount between about 1 mg and about 3 mg;
cyanocobalamin in an amount between about 6 mg and about 12 mg;
niacin in an amount between about 10 mg and about 50 mg;
vitamin D in an amount between about 200 IU and about 500 IU;
vitamin E in an amount between about 10 IU and about 50 IU;
folic acid in an amount of about 1 mg;
biotin in an amount between about 10 mcg and about 50 mcg;
calcium;
iron;
magnesium in an amount between about 100 mg and about 400 mg;
zinc; and
selenium in an amount between about 5 mcg and about 50 mcg.

3. The nutritional supplement according to claim 2, wherein the thiamine component in the single pill is in an amount of about 100 mg.

4. A nutritional supplement for administration to persons being treated for nutritional deficiencies associated with addiction to alcohol, the nutritional supplement consisting of a single pill, wherein the single pill comprises the following components:

thiamine in an amount between about 50 mg and about 100 mg;
folic acid in an amount of about 1 mg;
riboflavin in an amount between about 1 mg and about 3 mg;
pyridoxine in an amount between about 1 mg and about 3 mg;
cyanocobalamin in an amount between about 6 mg and about 12 mg;
biotin in an amount between about 10 mcg and about 50 mcg;
niacin in an amount between about 10 mg and about 50 mg;
vitamin D in an amount between about 200 IU and about 500 IU; and
vitamin E in an amount between about 10 IU and about 50 IU.

5. The nutritional supplement according to claim 4, wherein the thiamine component in the single pill is in an amount of about 100 mg.

6. The nutritional supplement according to claim 4, wherein the single pill further comprises the following components:

vitamin A; and
vitamin C.

7. The nutritional supplement according to claim 6, wherein the thiamine component in the single pill is in an amount of about 100 mg.

8. The nutritional supplement according to claim 6, wherein the single pill further comprises the following components:
   selenium in an amount between about 5 mcg and about 50 mcg; and
   magnesium in an amount between about 100 mg and about 400 mg.

9. The nutritional supplement according to claim 8, wherein the thiamine component in the single pill is in an amount of about 100 mg.

10. The nutritional supplement according to claim 8, wherein the single pill further comprises the following components:
    calcium;
    iron; and
    zinc.

11. The nutritional supplement according to claim 10, wherein the thiamine component in the single pill is in an amount of about 100 mg.

12. The nutritional supplement according to claim 4, wherein the single pill further comprises the following components:
    selenium in an amount between about 5 mcg and about 50 mcg; and
    magnesium in an amount between about 100 mg and about 400 mg.

13. The nutritional supplement according to claim 12, wherein the thiamine component in the single pill is in an amount of about 100 mg.

14. The nutritional supplement according to claim 12, wherein the single pill further comprises the following components:
    calcium;
    iron; and
    zinc.

15. The nutritional supplement according to claim 14, wherein the thiamine component in the single pill is in an amount of about 100 mg.

16. The nutritional supplement according to claim 4, wherein the pill is an extended-release pill.

\* \* \* \* \*